G. A. LONG.
MACHINE FOR HANDLING ENSILAGE.
APPLICATION FILED AUG. 20, 1919.
1,353,405.
Patented Sept. 21, 1920.
3 SHEETS—SHEET 2.
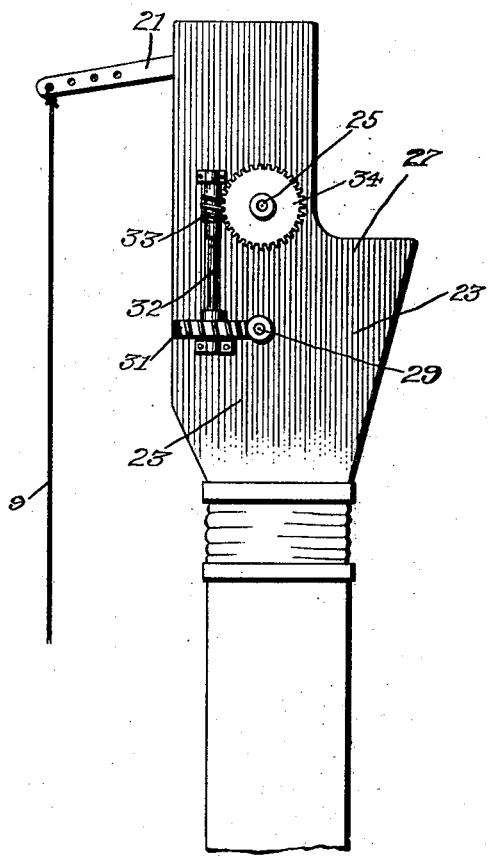
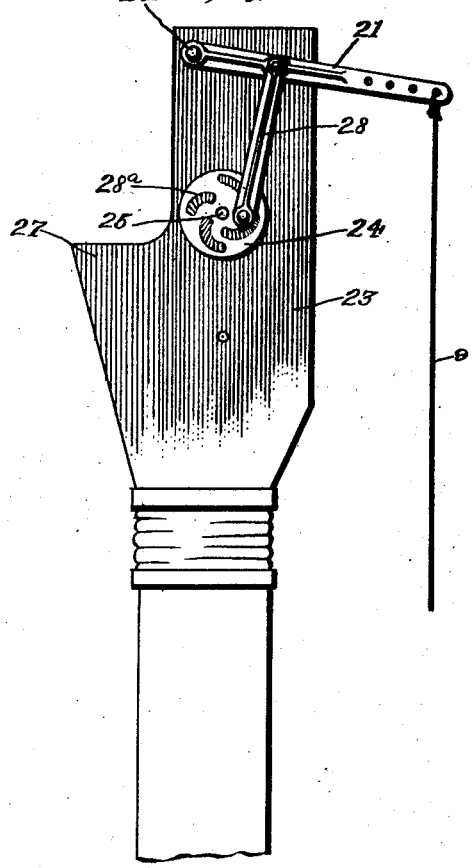
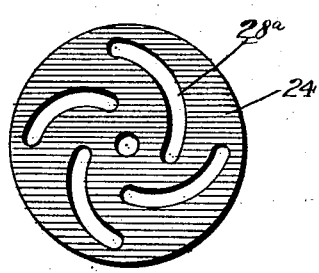
WITNESSES
INVENTOR
George A. Long,
BY
ATTORNEYS

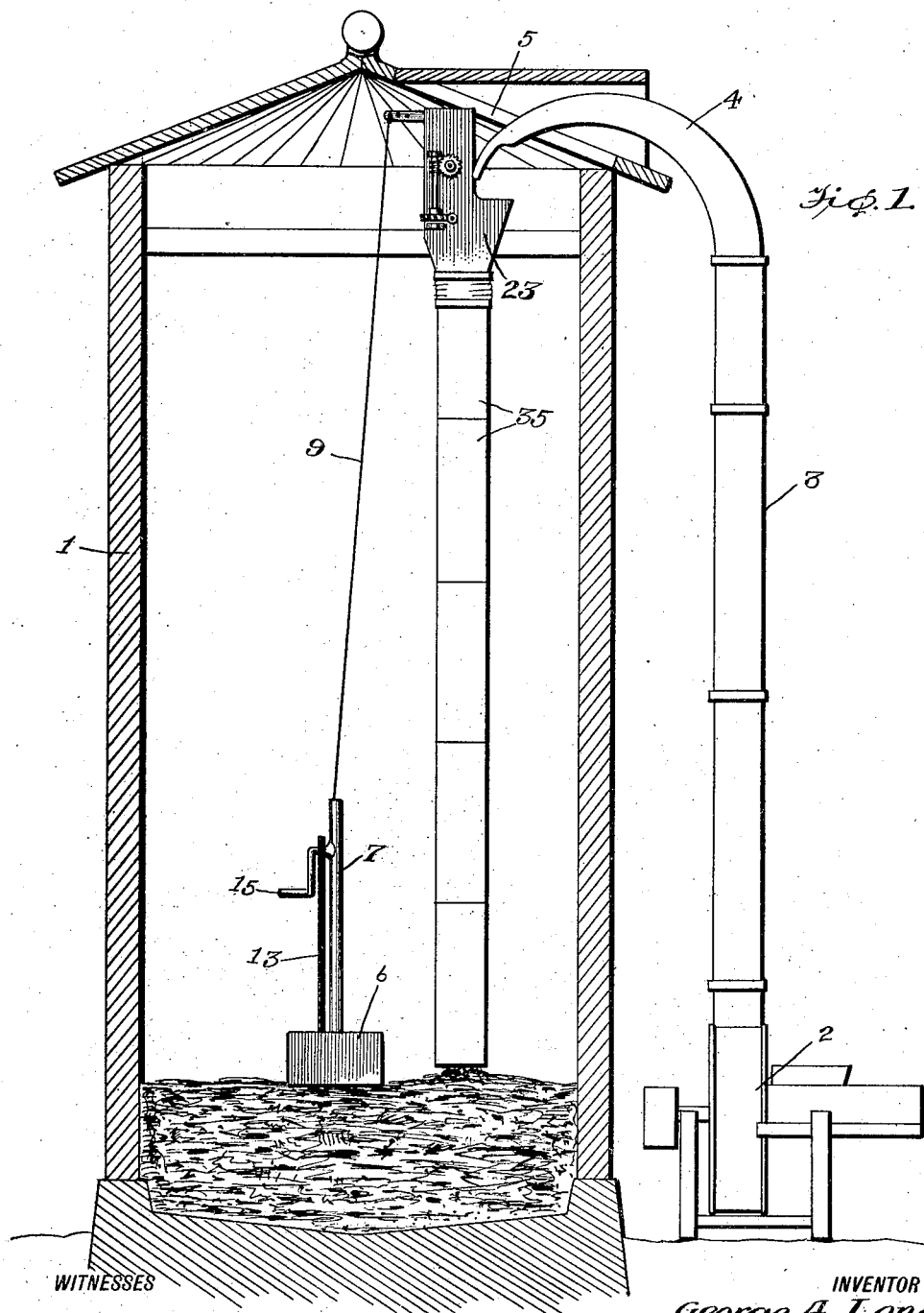

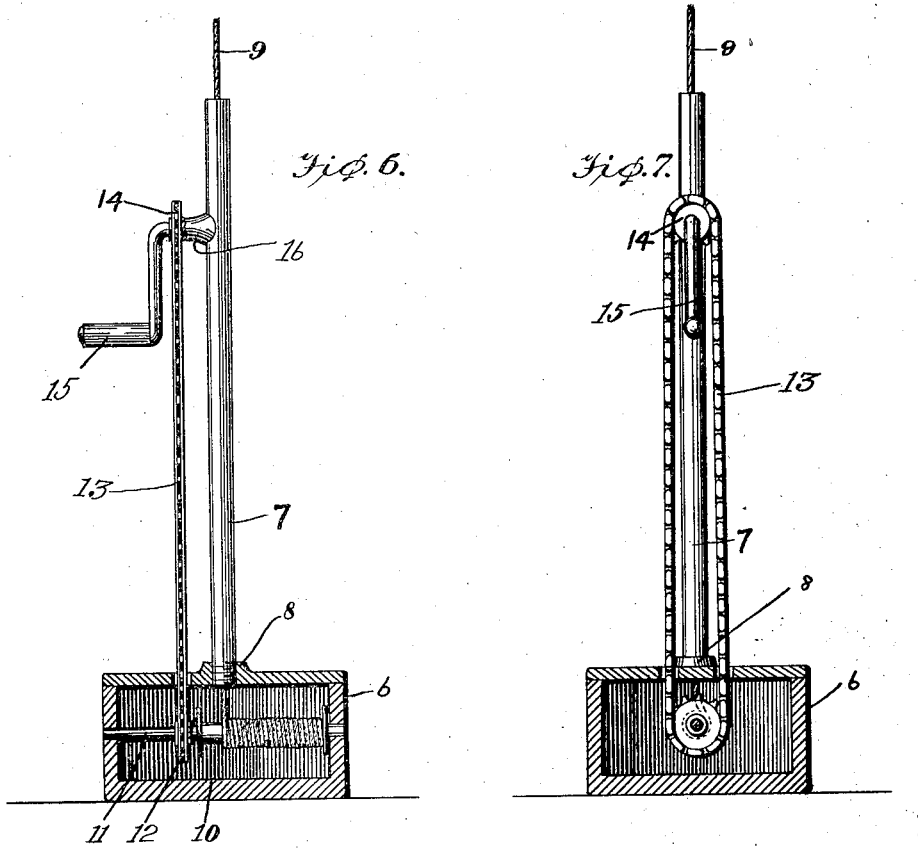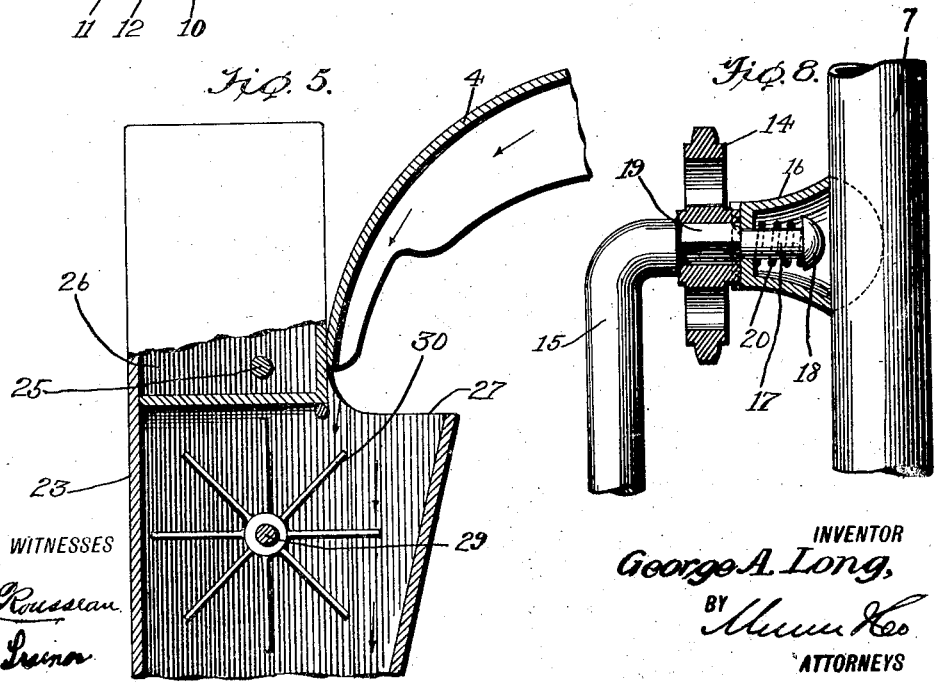

UNITED STATES PATENT OFFICE.

GEORGE A. LONG, OF MOORESVILLE, INDIANA.

MACHINE FOR HANDLING ENSILAGE.

1,353,405.   Specification of Letters Patent.   Patented Sept. 21, 1920.

Application filed August 20, 1919. Serial No. 318,731.

*To all whom it may concern:*

Be it known that I, GEORGE A. LONG, a citizen of the United States, and a resident of Mooresville, in the county of Morgan and State of Indiana, have invented certain new and useful Improvements in Machines for Handling Ensilage, of which the following is a specification.

My invention is an improvement in machines for handling ensilage, and the invention has for its object to provide a machine of the character specified especially adapted for use in silos for tamping the ensilage as it is placed in the silo, wherein the machine is operated by the feeding of the ensilage from the cutter.

In the drawings:

Figure 1 is a sectional view of a silo provided with the improved machine, and showing the cutter for the ensilage;

Fig. 2 is a side view, showing the upper end of the controlling mechanism for the tamper;

Fig. 3 is a view looking at the opposite side from Fig. 2;

Fig. 4 is a plan view of the slotted disk;

Fig. 5 is a vertical section showing the operating mechanism for the tamper;

Fig. 6 is a sectional view of the tamper;

Fig. 7 is a similar view at right angles to Fig. 5;

Fig. 8 is a detail side view, with parts in section, showing the adjustment controlling mechanism.

The present embodiment of the invention is shown in connection with a silo 1 of usual construction, and the cutter 2 for the ensilage feeds the same through a delivery pipe 3 to the silo. This pipe 3 has a gooseneck 4 at its upper end in the form of an open chute, which feeds through an opening 5 in the roof of the silo.

The improvement comprises a tamper 6 in the form of a box or hollow casing of rectangular cross section having connected with the center of the top thereof a pipe 7, the said pipe being threaded into a nipple 8 in the top of the casing.

A flexible member 9, as, for instance, a rope or cable, supports the tamper, the cord being connected with a reel 10 secured to a shaft 11 which is journaled in the casing 6. This shaft carries a sprocket wheel 12 which is connected by a chain 13 with a similar wheel 14 on a crank 15, which is journaled in a nipple 16 near the top of the pipe 7.

This crank has a journal pin 17 which passes into the nipple, and is headed, as indicated at 18, inside the nipple. A polygonal portion 19 is provided intermediate the journal pin and the body of the crank for engaging the hub of the sprocket wheel, and a coil spring 20 encircles the journal pin between the head and the end of the nipple, normally acting to push the crank toward the pipe.

The opposite end of the flexible member 9 is connected with a lever 21, which is pivoted as indicated at 22 to a casing 23, which is adapted to be arranged directly below the delivery end of the gooseneck 4. This lever has a series of openings for engagement by the flexible member, to vary the length of the stroke of the tamper, and the lever is vibrated by means of a cam wheel 24 which is secured to a shaft 25 journaled transversely of the casing 23.

This shaft 25 is in a compartment 26 at the top of the casing, and it will be noticed that the casing has a lateral inlet 27 opening upwardly, into which the gooseneck 4 feeds. A link 28 is pivoted to the lever 21 intermediate its ends, and the lower end of the link has an inwardly extending pin which is adapted to engage one of a series of slots 28$^a$ of the cam wheel or disk 24. These slots 28$^a$ are arc shaped, as shown, and are inclined with respect to the axis of the wheel, and it will be evident that by engaging the pin with different portions of the slots the extent of vibration of the lever 21 may be varied.

The shaft 25 is driven by a shaft 29 which is journaled in the inlet 27 of the casing 23, the said shaft having series of radial blades 30, which are adapted to be engaged by the air current from the ensilage cutter and by the cut ensilage to rotate the shaft 29. The shaft 29 has a worm which meshes with a worm wheel 31 on a vertical shaft 32 journaled on the outer face of the casing 23. The upper end of this shaft 32 has a worm 33 which meshes with a worm wheel 34 on the shaft 25.

In operation, an operator will be within the silo, to guide the tamper. As the ensilage is cut by the cutter it is fed through the chute 3—4 into the casing 23, and the air current and the ensilage impinging upon the blades 30 will rotate the shaft 29, and this shaft will drive the shaft 25 at a greatly reduced speed. The lever 21 will be vibrated, and the tamper will be raised and lowered to firmly tamp the ensilage as it is fed to the silo.

The operator, by means of the crank 15, may keep the tamper at the proper height to properly tamp the ensilage, and he may move it around to different parts of the silo, wherever it is desired to tamp. The casing 23 may be supported in any suitable or desired manner in the silo, and the lower or outer end thereof is connected to a sectional feed pipe 35. The said pipe is sectional for permitting the lower sections to be removed as the silo fills.

I claim:

1. In combination, a tamper for ensilage, means for moving the tamper vertically to tamp the ensilage, controlled by the feeding of ensilage to the silo, said tamper having a handle for convenience in manipulating the same, and means for raising and lowering the tamper with respect to the controlling means and operable at the tamper.

2. In combination, a tamper for cut ensilage, and means controlled by the feeding of cut ensilage to a silo for moving the tamper vertically to tamp the ensilage.

3. In combination, a tamper for ensilage, a casing through which the cut ensilage is adapted to be fed, means within the casing and controlled by the feed of the cut ensilage for lifting the tamper, a connection between the said means and the tamper, and means in connection with the said connection for raising and lowering the tamper.

4. In combination a tamper and means for operating said tamper and controlled by the feeding of cut ensilage to the silo, said operating means comprising a shaft having radial blades, a lever pivoted to the casing and connected to the tamper, a connection between the shaft and the lever for vibrating said lever, the connection between the tamper and the lever being flexible, and means at the tamper for winding up said connection or unwinding the same to raise and lower the tamper.

5. In combination, a tamper, means for operating said tamper controlled by the feeding of cut ensilage to a silo, said operating means comprising a shaft having radial blades, a lever pivoted to the casing and connected to the tamper, and a connection between the shaft and the lever for vibrating said lever.

6. In combination a tamper, and means for operating said tamper and controlled by the feeding of cut ensilage to a silo.

7. In combination, a tamper for cut ensilage, a shaft having lateral plates and adapted to be rotated by the feeding of cut ensilage to a silo, and a connection between the shaft and the tamper for operating said tamper when the shaft is rotated.

8. In combination, a tamper for cut ensilage, means for operating the tamper, controlled by the feeding of cut ensilage to the silo.

GEORGE A. LONG.